(12) United States Patent
Freeling

(10) Patent No.: US 7,706,694 B2
(45) Date of Patent: Apr. 27, 2010

(54) PROCESSOR FOR ENTANGLED COMPLEX SIGNALS

(75) Inventor: Richard Freeling, Ypsilanti, MI (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 812 days.

(21) Appl. No.: 11/459,721

(22) Filed: Jul. 25, 2006

(65) Prior Publication Data

US 2007/0165233 A1  Jul. 19, 2007

Related U.S. Application Data

(60) Provisional application No. 60/701,969, filed on Jul. 25, 2005.

(51) Int. Cl.
    H04B 10/04    (2006.01)
(52) U.S. Cl. .................. 398/183; 398/184; 398/152; 398/65; 356/450; 356/497; 250/458.1; 385/122; 380/256; 380/277
(58) Field of Classification Search .......... 398/183, 398/140, 152, 184, 201, 205, 202, 185, 65; 356/497, 450, 364, 451, 484, 369; 250/458.1; 385/122; 380/256, 277
    See application file for complete search history.

(56) References Cited

U.S. PATENT DOCUMENTS

| | | |
|---|---|---|
| 4,225,938 A | 9/1980 | Turpin |
| 4,286,328 A | 8/1981 | Bocker |
| 4,369,363 A | 1/1983 | Quint et al. |
| 4,468,093 A | 8/1984 | Brown |
| 4,633,427 A | 12/1986 | Bocker |
| 5,339,182 A | 8/1994 | Kimble et al. |
| 5,420,905 A | 5/1995 | Bertozzi |
| 5,515,438 A | 5/1996 | Bennett et al. |
| 5,796,477 A | 8/1998 | Teich et al. |
| 5,917,322 A | 6/1999 | Gershenfeld et al. |
| 6,057,541 A | 5/2000 | Steenblik |
| 6,252,665 B1 | 6/2001 | Williams et al. |
| 6,272,224 B1 | 8/2001 | Mazourenko et al. |
| 6,289,104 B1 | 9/2001 | Patterson et al. |
| 6,314,189 B1 | 11/2001 | Motoyoshi et al. |
| 6,424,665 B1 | 7/2002 | Kwiat et al. |

(Continued)

FOREIGN PATENT DOCUMENTS

EP    1 091 240    4/2001

(Continued)

OTHER PUBLICATIONS

Abouraddy et al., Degree Of Entanglement For Two Qubits, Physical Review A, vol. 64, 050101-1 to 050101-4, 2001.

(Continued)

*Primary Examiner*—Hanh Phan
(74) *Attorney, Agent, or Firm*—Hunton & Williams LLP

(57) ABSTRACT

A system for and method of processing complex signals encoded into quantum states is presented. According to an embodiment of the invention, polarized components of a pump laser beam are separated and respectively modulated with first and second signals. The modulated polarized components are directed to adjacent non-linear crystals with optical axes aligned at right angles to each-other. Information regarding at least one of the first and second signals is then derived from measurements of coincidence events.

26 Claims, 4 Drawing Sheets

U.S. PATENT DOCUMENTS

| | | | |
|---|---|---|---|
| 6,430,345 | B1 | 8/2002 | Dultz et al. |
| 6,444,999 | B1 | 9/2002 | Tomita |
| 6,480,283 | B1 | 11/2002 | Williams et al. |
| 6,522,749 | B2 | 2/2003 | Wang |
| 6,646,727 | B2 | 11/2003 | Saleh et al. |
| 6,678,054 | B1 | 1/2004 | Dress et al. |
| 7,302,187 | B1 * | 11/2007 | Roberts et al. .............. 398/140 |
| 7,304,314 | B2 * | 12/2007 | Zaugg ..................... 250/458.1 |
| 2002/0018290 | A1 | 2/2002 | Birk et al. |
| 2002/0020819 | A1 | 2/2002 | Wolleschensky et al. |
| 2002/0036775 | A1 | 3/2002 | Wolleschensky et al. |
| 2002/0093632 | A1 | 7/2002 | Teich et al. |
| 2002/0097874 | A1 | 7/2002 | Foden et al. |
| 2002/0109840 | A1 | 8/2002 | Wolleschensky et al. |
| 2002/0140941 | A1 | 10/2002 | Pedigo |
| 2003/0002670 | A1 | 1/2003 | Wang |
| 2003/0086138 | A1 | 5/2003 | Pittman et al. |
| 2004/0036877 | A1 | 2/2004 | Sergienko et al. |
| 2004/0208638 | A1 | 10/2004 | Jansen |
| 2005/0094818 | A1 | 5/2005 | Inoue et al. |

FOREIGN PATENT DOCUMENTS

| | | |
|---|---|---|
| WO | WO 02/45468 A2 | 6/2002 |
| WO | WO 03/019282 A2 | 3/2003 |
| WO | WO 03/019283 A2 | 3/2003 |
| WO | WO 03/019284 A2 | 3/2003 |

OTHER PUBLICATIONS

Abouraddy et al., Double-Slit Interference Of Biphotons Generated In Spontaneous Parametric Downconversion From A Thick Crystal, Journal of Optics B: Quantum and Semiclassical Optics 3, 2001, S50-S54.

Abouraddy et al., Role Of Entanglement In Two-Photon Imaging, Physical Review Letters, vol. 87, No. 12, Sep. 17, 2001, 123602-1 to 123602-4.

Almeida et al., Transmission Of Quantum Images Through Long Distances, pp. 1-4, (download date unknown), http://arxiv.org , Dec. 15, 2003.

Altepeter et al., Ancilla-Assisted Quantum Process Tomography, Physical Review Letters, vol. 90, No. 19, May 16, 2003, 193601- to 193601-4.

Atature et al., Entanglement in Cascaded-Crystal parametric Down-Conversion, Physical Review Letters, vol. 86, No. 18, Apr. 30, 2001, 4013-4016.

Barbosa, Twin Photons Entangled in Polarization and Angular Momentum, Eur. Phys. J. D22, 433-440 (2003).

Berthiaume et al., The Quantum Challenge to Structural Complexity theory, 132-137, 1992.

Blum, Density Matrix Theory and Applications, 1-217, 1981.

Boeuf et al., Calculating Characteristics of Non-Collinear Phase-Matching in Uniaxial biaxial crystals, Optical Technology Division, pp. 1-24, 2000.

Bouwmeester et al., Experimental Quantum Teleportation, Nature, vol. 390, Dec. 11, 1997, pp. 575-579.

Braunstein et al., Dense Coding for Continuous Variables, Physical Review A, vol. 61, 042302-1 to 04302-4, 2002.

Caetano et al., Image-Polarization Entanglement in Parametric Down-Conversion, 4 pages, 2003.

Caetano et al., Quantum Distillation of Position Entanglement with the Polarization Degrees of Freedom, ScienceDirect, Optics Communications, Mar. 3, 2004, (www.sciencedirect.com/science).

Caetano et al., Quantum Image Control Through Polarization Entanglement in Parametric Down-Conversion, Physical Review A 68, 023805 (2003).

Caetano et al., Quantum Physics, Abstract, "Image formation by Manipulation of the Entangled Angular Spectrum", pp. 1-5, (download date unknown), http://arxiv.org, 2003.

Ekert et al., Quantum Computation and Shor's Factoring Algorithm, Reviews of Modern Physics, vol. 68, No. 3, Jul. 1996, 733-753.

Ekert, Quantum Cryptography Based on Bell's Theorem, Physical Review Letters, vol. 67, No. 6, Aug. 5, 1991, 661-663.

Enzer et al., Entangled-Photon Six-State Quantum Cryptography, New Journal of Physics 4 (2002) 45.1-45.8.

Fei et al., Entangled-induced Two-Photon Transparency, Physical Review Letters, vol. 78, No. 9, Mar. 3, 1997, pp. 1679-1682.

Fonseca et al., Quantum Interference by a Non-Local Double Slit, Physical Review A, vol. 60, No. 2, Aug. 1999, 1530-1533.

Gatti et al., Multi-Photon, Multi-Mode Polarization Entanglement In Parametric Down-Conversion, pp. 1-22 (download date unknown), http:/ /arxiv.org, 2003.

Georgiades et al., Non-Classical Excitation For Atoms In A Squeezed Vacuum, Physical Review Letters, vol. 75, No. 19, Nov. 6, 1995, 3426-3429.

Giacomini et al., Active Teleportation Of A Quantum Bit, Physical Review A, 66, 030302(R) (2000).

Grover, Quantum Computers Can Search Arbitrarily Large Databases By A Single Query, Physical Review Letters vol. 79, No. 23, Dec. 8, 1997, 4709-4712.

Johnson, Magiq Employs Quantum Technology For Secure Encryption, Advanced Technology, printed Apr. 12, 2004 {http:/ /www.eetimes.com/at/news/OEG20021105S0019}, 3 pages.

Joobeur et al., Spatiotemporal Coherence Properties Of Entangled Light Beams Generated By Parametric Down-Conversion, Physical Review A , vol. 50, No. 4, Oct. 1994, 3349-3361.

Jost et al., Spatial Correlations Of Spontaneously Down-Converted Photon Pairs Detected With A Single-Photon-Sensitive CCD Camera, Optics Express 81, Jul. 20, 1998, vol. 3, No. 2.

Jost et al., Spatial Correlations Of Spontaneously Down-Converted Photon Pairs Detected With A Single-Photon-Sensitive CCD Camera, Optics Express, Jul. 20, 1998, vol. 3, No. 2, pp. 81-88.

Kurtsiefer et al., High-Efficiency Entangled Photon Pair Collection In Type-II Parametric Fluorescence, Physical Review A, vol. 64, 023802-1 to 023802-4, 2001.

Kwiat et al., Experimental Entanglement Distillation And 'Hidden' Non-Locality, Letter to Nature, 1014-1017, 2001.

Kwiat et al., Experimental Verification Of Decoherence-Free Subspaces, Science, vol. 290, Oct. 20, 2000, 498-500.

Kwiat et al., Ultra-Bright Source Of Polarization-Entangled Photons, Physical Review A, vol. 60, No. 2, Aug. 1999, 773-776.

Law et al., Analysis and Interpretation of High Transverse Entanglement in Optical Parametric Down Conversion, Physical Review Letters, vol. 92, No. 12, Mar. 26, 2004.

McCulagh, Start-Up Makes Quantum Leap Into Cryptography, C/NET News.com, printed Apr. 12, 2004, {http:/ /news.com.com/2100-1029-5103373.html}, 3 pages.

Monken et al., Transfer Of Angular Spectrum And Image Formation In Spontaneous Parametric Down-Conversion, Physical Review A, vol. 57, No. 4, Apr. 1998, 3123-3126.

Naik et al., Entangled State Quantum Cryptography: Eavesdropping On The Eckert Protocol, Physical Review Letters, vol. 84, No. 20, May 15, 2000, 4733-4736.

Nasr et al., Biphoton Focusing for Two-Photon Excitation, Physical Review A, vol. 65, 023816-1 to 023816-6, 2002.

O'Sullivan-Hale et al., Pixel Entanglement: Experimental Realization of Optically Entangled $d=3$ and $d=6$ Qudits, Physical Review Letters, vol. 92, No. 12, Jun. 10, 2005.

Oberparleiter et al., Optics Communications, 183 (2000) 133-137.

O'Neill, Quantum Information Studies, Department of Experimental Physics, {http:/ /www.may.ie/academic/physics/quantum.shtml}, printed Feb. 25, 2004, 2 pages.

Perina et al., Multiphoton Absorption Cross Section and Virtual-state Spectroscopy for the Entangled n -Photon State, Physical Review A, vol. 57, No. 5, May 1998, pp. 3972-3986.

Rarity et al., Experimental Demonstration of Single Photon Rangefinding Using Parametric Down Conversion, Applied Optics, vol. 29, No. 19, Jul. 1, 1990, pp. 2939-2943.

Ribeiro et al., Image and Coherence Transfer in the Stimulated Down-Conversion Process, Physical Review A, vol. 60, No. 6, Dec. 1999, 5074-5078.

Ribeiro et al., Image and Coherence Transfer in the Stimulated Down-Conversion Process, pp. 1-5, (download date unknown), http:/ /arxiv.org, 1999.

Ribeiro et al., Observation of Image Transfer and Phase Conjugation in Stimulated Down-Conversion, Physical Review Letters, vol. 87, No. 13, Sep. 24, 2001, 133602-1 to 133602-4.

Ribeiro et al., Observation of Image Transfer and Phase Conjugation in Stimulated Down-Conversion, pp. 1-6, (download date unknown), http://arxiv.org, 2001.

Rubin et al., Theory of Two-Photon Entanglement in Type-II Optical Parametric Down-Conversion, Physical Review A, vol. 50, No. 6, Dec. 1994, pp. 5122-5133.

Saleh et al., Entangled-Photon Virtual-State Spectroscopy, Physical Review Letters, vol. 80, No. 16, Apr. 20, 1998, 3483-3486.

Santos et al., Measurement Of The Degree Of Polarization Entanglement Through Position Interference, Physical Review A, vol. 64, 023804-1 to 023804-6, 2001.

Schenker, A Quantum Leap In Codes For Secure Transmissions, International Herald Tribune, printed Apr. 12, 2004, {http://www.iht.com/articles/126822.html}, 3 pages.

Sciarrino et al., Delayed-Choice Entanglement Swapping With Vacuum-One-Photon Quantum States, Physical Review A, 66, 024309 (2002).

Scully et al., Two-Photon Scheme For Detecting The Bell Basis Using Atomic Coherence, Physical Review Letters, vol. 83, No. 21, Nov. 22, 1999, 4433-4436.

Semat et al., Introduction To Atomic And Nuclear Physics, Fifth Edition, Chp. 7, Elements Of Quantum Mechanics, 186-215, 2005.

Sergienko et al., Quantum Cryptography With Femtosecond Parametric Down Conversion, Quantum Imaging Laboratory, pp. 1-8, 1999.

Strekalov et al., Two-Photon Processes In Faint Biphoton Fields, pp. 1-18, downloaded Mar. 9, 2005, http://arxiv.org, 2002.

Waks et al., Security Of Quantum Key Distribution With Entangled Photons Against Individual Attacks, Physical Review A, vol. 65, 052310-1 to 052310-16, 2002.

White et al., Nonmaximally Entangled States: Production, Characterization, And Utilization, Physical Review Letters, vol. 83, No. 16, Oct. 18, 1999, 3103-3107.

Yabushita et al., Spectroscopy By Frequency Entangled Photon Pairs, pp. 1-11 (download date unknown), http://arxiv.org, 2004.

Yabushita et al., Spectroscopy By Frequency Entangled Photon Pairs, Physical Review A 69. 013806-1-013806-4 (2004).

Zavatta, Premio Italgas/Italgas Prize Energy and Environment 16th Edition, Summary of the Thesis "Debut in the World of Research", 2005.

Zhang et al., Experimental And Theoretical Aspects Of Quantum Teleportation, Center for Engineering Science Advanced Research, 9 pages, 2002.

* cited by examiner

PROCESSOR FOR ENTANGLED COMPLEX SIGNALS

This application claims priority to U.S. Provisional Application No. 60/701,969 to Freeling entitled "PROCESSOR FOR ENTANGLED COMPLEX SIGNALS," the contents of which are incorporated by reference herein in their entirety.

BACKGROUND OF THE INVENTION

1. Field of the Invention

The invention relates to a system for and method of encoding classical complex signals into quantum entangled states. In particular, the invention relates to a general system for and method of quantum information processing.

2. Discussion of Background Information

Photons are quanta of electromagnetic energy. Multiple photons may be entangled or not entangled. Photons that are not entangled together (i.e., random photons) exist as independent entities. In contrast, entangled photons have a connection between their respective properties.

Two photons entangled together are referred to as an entangled-photon pair (also, "biphotons"). Traditionally, photons comprising an entangled-photon pair are called "signal" and "idler" photons. Measuring properties of one photon of an entangled-photon pair determines results of measurements of corresponding properties of the other photon, even if the two entangled photons are separated by a distance. As understood by those of ordinary skill in the art and by way of non-limiting example, the quantum mechanical state of an entangled-photon pair cannot be factored into a product of two individual quantum states.

In general, more than two photons may be entangled together. More than two photons entangled together are referred to as "multiply-entangled" photons. Measuring properties of one or more photons in a set of multiply-entangled photons restricts properties of the rest of the photons in the set by constraining measurement outcomes. As understood by those of ordinary skill in the art and by way of non-limiting example, the quantum mechanical state of a set of n>2 multiply-entangled photons cannot be factored into a product of n separate states. The term "entangled photons" refers to both biphotons and multiply-entangled photons.

SUMMARY OF THE INVENTION

The present invention provides a novel technique for performing computations and processing images using entangled photons. The systems and methods according to certain embodiments of the present invention take advantage of faster processing time made available by artful use of quantum entanglement properties of light. The techniques presented herein may be adapted to perform a wide range of computations and processing algorithms. Thus, embodiments of the present invention may be used for general optical computing and image processing. No generalized optical computing and processing techniques having the adaptability and advantages of the present invention exist in the prior art.

According to an embodiment of the present invention, an apparatus for processing entangled complex signals is presented. The apparatus includes a source of light. The apparatus also includes a polarizer in optical communication with the source of light configured to produce polarized light. The apparatus further includes a first aperture configured to receive light having a first polarization and produce first encoded light. The apparatus further includes a second aperture configured to receive light having a second polarization and produce second encoded light. The apparatus further includes at least two adjacent nonlinear crystals configured to receive the first encoded light and the second encoded light, the two adjacent nonlinear crystals being separated by a distance. The apparatus further includes a coincidence counter configured to detect coincidences between photons.

According to another embodiment of the present invention, a method for processing complex signals is presented. The method includes generating polarized light. The method also includes splitting the polarized light into a first polarized component spatially separated from a second polarized component. The method further includes modulating the first polarized component with a first complex signal. The method further includes modulating the second polarized component with a second complex signal. The method further includes directing the first polarized component and the second polarized component through at least two adjacent nonlinear crystals. The method further includes manipulating a distance between the adjacent nonlinear crystals. The method further includes performing at least one coincidence measurement. The method further includes determining at least one parameter associated with at least one of the first complex signal and the second complex signal.

According to another embodiment of the present invention, a method for processing complex signals is presented. The method includes providing light. The method also includes imposing a first signal on a first polarized component of the light to produce first encoded light. The method further includes imposing a second signal on a second polarized component of the light to produce second encoded light. The method further includes transmitting the first encoded light and the second encoded light through adjacent nonlinear crystals separated by a distance. The method further includes determining properties of one of the first signal and the second signal using results of at least one coincidence measurement.

According to another embodiment of the present invention, a method of encoding classical information as a quantum state is presented. The method includes producing light. The method also includes separating the light into a first polarized component and a second polarized component. The method further includes modulating the first polarized component with a first classical signal to produce first modulated light. The method further includes modulating the second polarized component with a second classical signal to produce second modulated light. The method further includes directing the first modulated light and the second modulated light through a first downconverter and a second downconverter.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION

Figure 1:
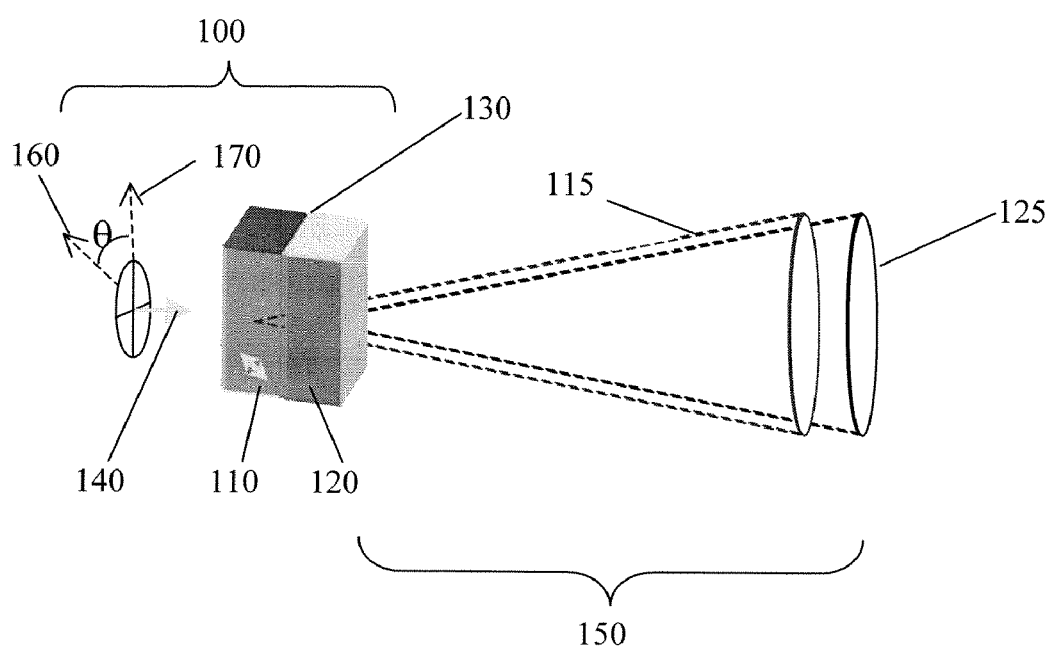
FIG. 1 is a schematic diagram of an entangled photon source according to an embodiment of the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, the description taken with the drawings provides a fundamental understanding of the present invention, making apparent to those skilled in the art how the several forms of the present invention may be embodied in practice.

I. Introduction

In the last decade, researchers have exerted much effort in understanding nontrivial polarization properties of light as described by the theory of quantum mechanics. In particular, researchers continue to expend considerable efforts toward understanding the quantum properties of polarization-entangled states generated by type-I spontaneous parametric down-conversion. Such states may be used to study certain aspects of quantum information processing. In the optical domain, they relate to quantum computing, quantum cryptography and a host of fourth-order interference effects. See, e.g., E. Knill, R. Laflamme, and G. J. Milburn, Nature 409, 46 (2001) (discussion quantum computing), T. Jennewein, et al., Phys. Rev. Lett. 84, 4729 (2000) (discussing quantum cryptography), and C. H. Monken, P. H. Souto Ribeiro, and S. Padua, Phys. Rev. A 57, 3123 (1998) (discussing fourth-order interference effects).

One embodiment of the present invention provides a system for and method of optically encoding classical complex signals into polarization-entangled states and subsequently manipulating such states for the purpose of quantum information processing. In the encoding step, one polarization component of a laser beam is directed to an aperture corresponding to a first signal, and another polarization component is directed to an aperture corresponding to a second signal. The two polarization components are then recombined and directed to a pair of non-linear crystals where they undergo type-I spontaneous parametric downconversion. When a non-linear crystal is thin, a consequence of phase-matching conditions in the down-conversion process within the crystal is that the angular spectrum of the incident beam is transferred to the two-photon state resulting from the down-conversion process. The image (angular spectrum) encoded in the first polarization component of the pump laser beam is thus transferred to a two-photon state via a down-conversion process.

Subsequent manipulation of the resulting quantum state offers the opportunity to control the transverse profile of the coincidence detection without disturbing the incident intensity. (Photon detectors coupled to a coincidence counter are placed so as to detect coincidences between photons originating from the same crystal, whether it be the first crystal or the second crystal.) As an example of the type of processing that is available once a signal of interest is encoded, an embodiment of the present invention provides an algorithm for determining the amplitude and phase of an unknown state, given four measurements on the non-maximally entangled state containing a known state as well as the unknown state. For complex signal analysis, e.g., complex images, multiple entangled degrees of freedom may be employed. By way of non-limiting example, two spatially separated non-linear crystals may be used to provide one such degree of freedom, crystal separation in the direction of propagation, for manipulating the down-converted two-photon state.

One embodiment of the invention involves encoding complex signals and quantum-mechanically processing the encoded complex signals by way of polarization-entangled states resulting from type-I spontaneous parametric down-conversion in a pair of spatially separated non-linear ($\chi^{(2)}$) crystals. By way of non-limiting example, such classical-to-quantum encoding may be done by utilizing a laser source (e.g., UV or blue) polarized at some angle θ with respect to the vertical. The beam impinges on a polarization beam splitter sending the horizontal components down a path separated spatially from the vertical components. The separated horizontal and vertical pump beam components impinge on separate apertures and are subsequently recombined into a single beam. The combined beam is then directed to a pair of spatially separated non-linear crystals, which transfer the angular spectrum of the incident beam to a two-photon state resulting from the down-conversion process.

The embodiment is further described in terms of quantum mechanical techniques of processing the information contained in the two-photon state and providing a solution to the problem of amplitude and phase retrieval for an unknown complex signal. Such a solution provides a non-limiting example of an approach to processing classical complex signals, capitalizing on potential quantum speed-up available only in a quantum computational environment.

The exemplary embodiment is next described in more detail in two parts. The first part relates to the encoding of classical complex signal information in an entangled state. The second part relates to, among other effective techniques, a methodology for amplitude and phase determination for the quantum encoded unknown classical signal as achieved through measurements of the fourth-order correlation function.

II. Encoding Information

FIG. 1 is a schematic diagram of an exemplary entangled photon source 100 according to an embodiment of the present invention. In particular, source 100 provides a polarization-entangled state prepared using two non-linear crystals 110, 120. An entangled two-photon state 150 is emitted along cones 115, 125 generated by type-I down-conversion in crossed, adjacent non-linear crystals 110, 120. Cone 115 consists of horizontally-polarized light, while cone 125 consists of vertically-polarized light. Crystals 110, 120 are configured such that a spacing 130 between them may be controlled (in some instances, the crystals may contact each-other in direct abutment, as depicted in FIG. 1). Pump beam 140 is an approximate plane wave pump beam polarized at an angle θ 160 from vertical 170 and is incident on crossed, adjacent, non-linear crystals 110, 120 cut for type-I down-conversion. In this arrangement, with the pump beam direction and optical axis of first crystal 110 defining the vertical plane, and the optical axis of second crystal 120 rotated 90° with respect to the axis of first crystal 110, the pump direction and the optical axis of second crystal 120 forming the horizontal plane, a polarization-entangled two-photon state 150 is emitted by the pair of crystals 110, 120.

In the arrangement depicted in FIG. 1, if the pump polarization is aligned vertically, down-conversion occurs only in first crystal 110. Similarly, if the pump polarization is aligned horizontally, down-conversion occurs only in second crystal 120. When the pump polarization is set to θ=45°, down-conversion is equally likely in either crystal 110, 120, so photons are emitted in the maximally entangled state, which may be represented as, by way of non-limiting example:

$$|\psi\rangle = \frac{1}{\sqrt{2}}(|H\rangle|H\rangle + e^{i\phi}|V\rangle|V\rangle). \quad (1)$$

In the system represented by Equation (1), the relative phase $\phi$ is controlled by an ultraviolet quarter wave plate in the pump beam. The symbols $|V\rangle$ and $|H\rangle$ represent quantum states of vertically- and horizontally-polarized components. That down conversion is equally likely in either crystal 110, 120 is approximately true because the first beam power is somewhat attenuated in the second crystal 120 due to absorption in the first crystal 110. For pump beam polarization at an arbitrary angle $\theta \neq 45°$, the non-maximally entangled two-photon state 150 that emerges from the two-crystal source 100 may be represented as, by way of non-limiting example:

$$|\psi\rangle = \frac{1}{\sqrt{1+\delta^2}}(|H\rangle|H\rangle + \delta e^{i\phi}|V\rangle|V\rangle). \quad (2)$$

In Equation (2), the symbol $\delta$ represents $\mathrm{Tan}(\theta)$ (i.e., $\delta \equiv \mathrm{Tan}(\theta)$). The remaining terms Equation (1).

Figure 2:
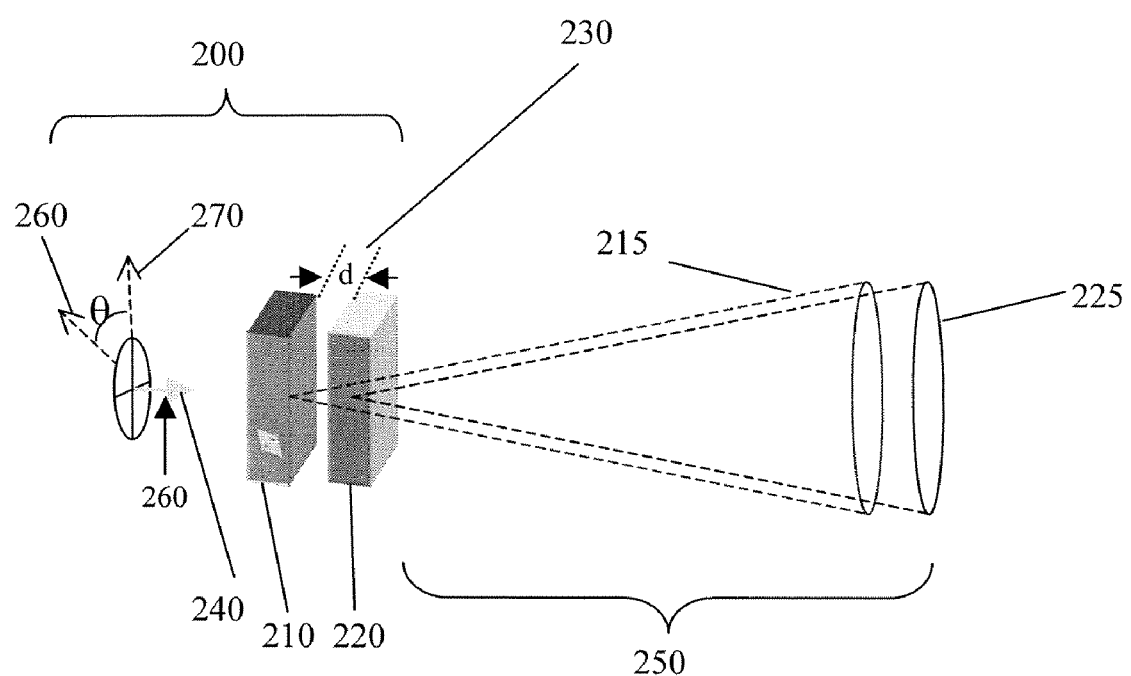
FIG. 2 is a schematic diagram of an entangled photon source having adjustable crystal separation according to an embodiment of the present invention.

FIG. 2 is a schematic diagram of an entangled photon source according to an exemplary embodiment of the present invention. In particular, FIG. 2 depicts an entanglement source 200 using type-I down-conversion in crossed, spatially separated, non-linear crystals 210, 220. Similar to the embodiment of FIG. 1, an entangled two-photon state 250 is emitted along cones 215, 225 generated by type-I down-conversion in crossed, adjacent non-linear crystals 210, 220. Cone 215 consists of horizontally-polarized light, while cone 225 consists of vertically-polarized light. The crystals 210, 220 are configured such that an inter-crystal distance 230 may be manipulated. In some instances, crystals 201, 220 may directly abut each-other. As in the embodiment of FIG. 1, the pump beam direction and the optical axis of first crystal 210 lie in the vertical plane, and the pump beam direction and the optical axis of second crystal 220 lie in the horizontal plane. In another similarity with embodiment of FIG. 1, the embodiment of FIG. 2 may be used to produce maximally or non-maximally entangled states by selection of an appropriate angle $\theta$ 160 with respect to the vertical 270.

FIG. 2 depicts two modifications of the embodiment of FIG. 1 that result in greater control over the produced polarization-entangled state. First, complex transverse momentum structures 260 (multi-mode) are imposed separately on the horizontal and vertical polarization components of pump beam 240 before recombining them and sending pump beam 240 into the two crystals 210, 220. Second, the relative phase of the components of the output state 250 are controlled by a small spatial separation 230 of the two down-conversion crystals.

Figure 3:
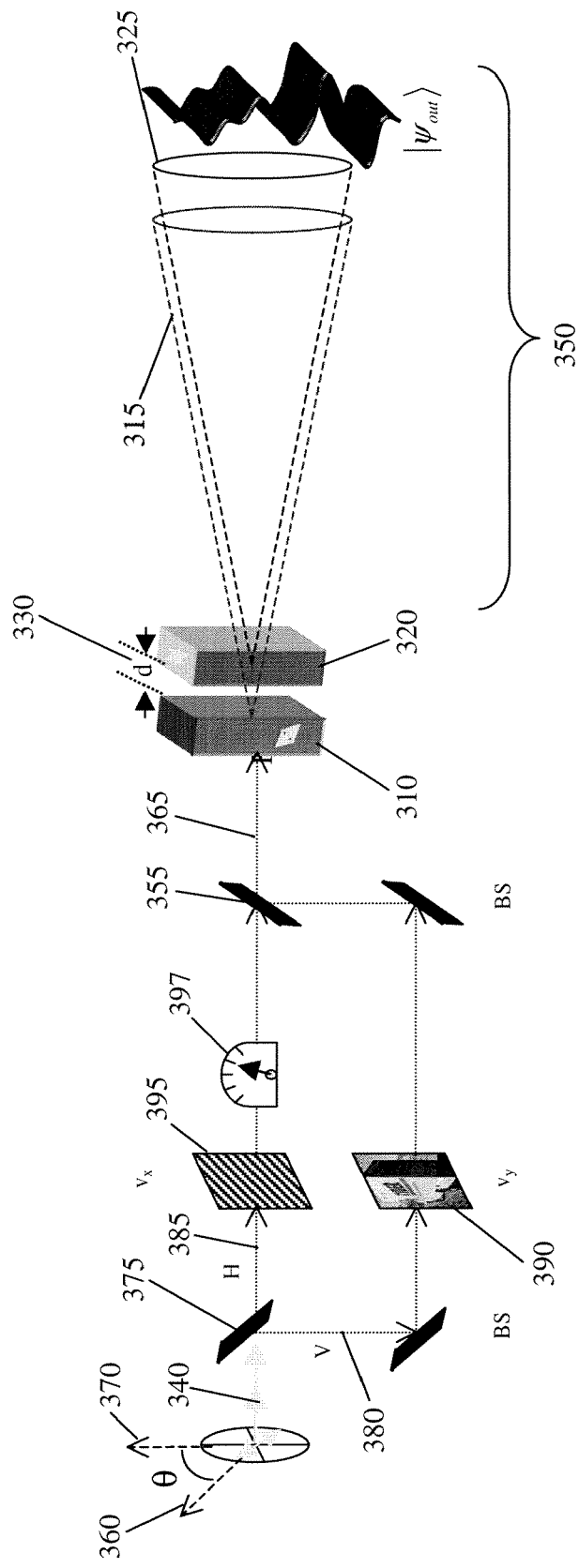
FIG. 3 is a schematic diagram of an embodiment of the present invention.

FIG. 3 is a schematic diagram of an exemplary embodiment of the present invention. In particular, FIG. 3 schematically depicts a system for the production of an entangled output state $|\psi_{out}\rangle$ 350, given input pairs of classical complex angular spectra $\{v_x, v_y\}$, one or both of which may be unknown. In the embodiment of FIG. 3, a laser produces a pump beam 340, which is directed to a polarizer configured to impart a selectable polarization to the beam at an angle of $\theta$ 360 to the vertical 370. By way of non-limiting example, $\theta$ may be 45°. Polarized pump beam 340 is then directed to polarizing beam splitter 375, which separates it into vertically polarized component 380 and horizontally polarized component 385.

One of the components, by way of non-limiting example, horizontally polarized component 385, passes through an adjustable optical delay 397 such as a movable mirror set in order to adjustably impart a delay (e.g., no delay) between the polarized beam components 380, 385. Each component 380, 385 is then directed to a respective aperture 390, 395. Thus, horizontally polarized component 385 is directed through aperture 395, which modulates it with a signal $v_x$, and vertically polarized component 380 is directed through aperture 390, which modulates it with a signal $v_y$. The signals are complex, in that their amplitude and phase each carry information. Thus, for each signal, and at any given time, the two values of the information-carrying parameters may be expressed as a single complex number. One value may be represented by the real part of the complex number and another value represented by the imaginary part of the complex number. In this manner, each polarization component 380, 385 is separately encoded with a complex signal. Second polarizing beam splitter 355 then combines the encoded vertically and horizontally polarized components 380, 385 into single beam 365, which it directs it to a pair of non-linear crystals 310, 320.

In the embodiment of FIG. 3, second non-linear crystal 320 is controllably separated a distance $d \geq 0$ (330) from the first non-linear crystal. Vertically polarized component 380 of incident pump beam 340 produces a horizontally polarized two-entangled photon state 315 through type-I spontaneous parametric down-conversion (SPDC). Because the two-entangled-photon state contains frequencies $\omega_s$, $\omega_i$, (each approximately half the pump frequency), which sum to the frequency of pump beam 340, second crystal 320 is essentially transparent to this state. In second crystal 320, horizontal component 385 of pump beam 340 produces a vertically polarized two-entangled photon state 325 through SPDC. When pump beam 340 is polarized at 45° from vertical 370, SPDC is equally likely to occur in first crystal 310 or in second crystal 320. These two processes have high spatial overlap (coherence) and produce a maximally-entangled state 350. In particular, output state 350 includes quadruples of multiply-entangled photons.

Output state $|\psi_{out}\rangle \propto |\psi_{v_x}(\vec{\rho}_+)\rangle + e^{i\phi(d,z,k)}|\psi_{v_y}(\vec{\rho}_+)\rangle$ (350) is a superposition of a quantum state whose (2-D) transverse momentum distribution (angular spectrum) is that of the classical input, $v_x$, with a state of (2-D) transverse momentum distribution identical to the input distribution $v_y$. These states are in superposition with a relative phase that is linearly dependent on the crystal separation, d 330. For thin crystals, the amplitudes of the two states 315, 325 are of the form of a convolution of the (complex) spatial distribution with the Fresnel-Huygens kernel (F) for free space propagation of a complex signal. Thus, if one of the inputs, say $v_x$ ($V_x(\vec{\rho}_+)$ in the spatial domain), represents, by way of non-limiting example, a synthetic aperture radar phase history, then in the output state 350, one would have the amplitude $F*V_x(\vec{\rho}_+)$ superposed with the amplitude $F*V_y(\vec{\rho}_+)$, with the relative phase between the two amplitudes depending linearly on d 330.

Summarizing the encoding step, images (angular spectrum) encoded in incident pump beam 340 by apertures 390, 395 are transferred to the two-photon state 350 via the downconversion process. They reside in this entangled quantum state in superposition with a relative phase difference that can be controlled by manipulating the crystal separation 330. This offers the opportunity to control either or both amplitudes (transverse profiles) and their relative phases without disturbing the incident pump intensity.

The encoded entangled state 350 is then processed and measured to reveal certain desired information. This amounts to implementing a quantum processing algorithm. Toward designing such an algorithm for a given particular purpose, the present disclosure proceeds to characterize the encoded entangled state in detail.

A general structure of the state produced by the encoding step is presented here. Though presented in relation to the embodiments of FIGS. 3 and 4, this discussion is not limited to such embodiments. For computational convenience, and by way of non-limiting example, assume horizontal component 385 of pump 340 has an imposed complex signal $V_y$, and that vertical component 380 of pump 340 has an imposed complex signal $V_x$. As a result of the down-conversion process, polarization entanglement is transformed into transverse momentum entanglement in the two-photon state 350. If this state 350 is cast into a spatial coordinate basis, the signals are essentially complex images. Thus, the down-conversion process in the crossed, separated crystals 310, 320 results in a state 350 that may be represented as, by way of non-limiting example:

$$|\psi\rangle = |\psi_y(\vec{\rho}_+, z)\rangle + e^{i\phi(d', \vec{\rho}_+, z)}|\psi_x(\vec{\rho}_+, z)\rangle. \quad (3)$$

In Equation (3), $(\vec{\rho}_+, z)$ indicate transverse and longitudinal spatial positions, respectively.

As discussed below in detail in relation to FIG. 4, photo detectors operatively coupled to a coincidence counter are placed at the output of the non-linear crystals so as to detect coincidences between photons originating from the same crystal, whether it be the first crystal or the second crystal. Coincidence count rate (R) is proportional to the fourth-order spatial correlation function derived from this maximally entangled state. The coincidence count rate therefore obeys a proportionality relationship that may be represented as, by way of non-limiting example:

$$R \propto G^*(\vec{\rho}_+)G(\vec{\rho}_+). \quad (4)$$

In Equation (4), the term $G(\vec{\rho}_+)$ may be represented as, by way of non-limiting example:

$$G(\vec{\rho}_+) = F^*V_y(\vec{\rho}_+) + e^{i\vec{\alpha}\cdot\vec{\rho}_+}F^*V_x(\vec{\rho}_+). \quad (5)$$

In Equation (5), F represents the Fresnel-Huygens kernel (below, $\vec{\alpha}$ is shown to be real and linearly proportional to the crystal separation distance, d').

If one of the complex signals, say $V_x(\vec{\rho}_+)$, is regarded as unknown, one can choose the other complex signal according to the user's needs. By way of non-limiting example, choosing $$V_y(\vec{p}_+) = \frac{1}{2\pi}e^{+i\vec{\alpha}\cdot\vec{p}_+}$$

allows determination of the unknown signal's amplitude and phase from four coincidence measurements, each with a differing $\vec{\alpha}$ (which is controlled by crystal separation 330). The unknown signal has a form that may be expressed as, by way of non-limiting example:

$$F^*V_x(\vec{\rho}_+) \equiv x(\vec{\rho}_+) + iy(\vec{\rho}_+). \quad (6)$$

Thus, $x(\vec{\rho}_+)$ represents the real part of $F^*V_x(\vec{\rho}_+)$ and $y(\vec{\rho}_+)$ represents the imaginary part of $F^*V_x(\vec{\rho}_+)$. Equation (6) uses the property of the Fresnel-Huygens kernel, which may be expressed as, by way of non-limiting example:

$$F^*V_y(\vec{\rho}_+) = 2\pi e^{-iz/k\vec{\alpha}\cdot\vec{\alpha}}V_y(\vec{\rho}_+). \quad (7)$$

Thus, the coincidence count rate, containing the unknown signal, may be expressed as, by way of non-limiting example:

$$R \propto 1 + |x(\vec{p}_+) + iy(\vec{p}_+)|^2 + 2\begin{bmatrix} x(\vec{p}_+)\cos\left(\frac{z\alpha^2}{k}\right) - \\ y(\vec{p}_+)\sin\left(\frac{z\alpha^2}{k}\right) \end{bmatrix}. \quad (8)$$

In particular, photo detectors operatively coupled to a coincidence counter are placed at the output of the non-linear crystals so as to detect coincidences between photons originating from the same crystal, whether it be the first crystal or the second crystal. The results of coincidence measurements with four differing $\vec{\alpha}$ (achieved by four different crystal separation distances) yields data for the unknown $F^*V_x(\vec{\rho}_+) \equiv x(\vec{\rho}_+) + iy(\vec{\rho}_+)$. Note that, in general and by way of non-limiting example:

$$F^{**}F = \delta. \quad (9)$$

Equations (8) and (9) imply that the unknown complex signal may be represented as, by way of non-limiting example:

$$F^{}(x(\vec{\rho}_+) + iy(\vec{\rho}_+)) = F^{}F^*V_x(\vec{\rho}_+) = V_x(\vec{\rho}_+). \quad (10)$$

The next section provides detailed derivations of the general state shown in Equation 3, the general expression for the fourth order coherence function summarized in Equation 5, and the unknown signal example of Equation 10.

III. Derivations and Analysis

In an embodiment of the present invention, entangled photons are produced using a pair of non-linear crystals. More particularly, such an embodiment produces entangled two-photon flux by way of two type-I non-linear, $\chi^{(2)}$, crystals arranged such that their optical axes lie in planes perpendicular to each other. By way of non-limiting example, such crystals may be constructed of beta barium borate (BBO). The pump beam and optic axis of the first crystal define the vertical plane; the optic axis of the second crystal defines the horizontal plane. If the pump polarization is vertically polarized, down-conversion occurs only in the first crystal. If the pump polarization is horizontally polarized, down-conversion occurs only in the second crystal. By pumping with a beam whose polarization is set at 45°, down-conversion is equally likely in either crystal. The two down-conversion processes are mutually coherent because the pump beam is reasonably assumed to be continuous. Under this assumption, which is appropriate, the pump beam has a long coherence length. Given the coherence and large spatial overlap of these processes, down-converted photons are created in the maximally entangled state shown above in Equation (1).

Next, classical image inputs are modulated into quantum entangled states. To transfer classical angular spectra to a quantum mechanical entangled state (classical-to-quantum encoding) the classical angular spectra are first (classically) encoded in orthogonal angular momentum states of a pump beam incident on a parametric down-conversion crystal (e.g., beta-barium borate-BBO). Within the crystal, in a non-linear $\chi^{(2)}$ process, pump photons spontaneously generate pairs of entangled photons, conserving overall momentum. Because of this conservation of overall momentum, the phase matching of all output modes at the crystal exit face provides, for thin crystals, transfer of the incident pump transverse momentum distribution to the two-photon output state. Thus, an image (angular spectrum) encoded in an incident pump beam is transferred to the two-photon state via the down-conversion process. Subsequent manipulation of the resulting two-photon state offers the opportunity to control the transverse profile of the coincidence detection without disturbing the incident intensity.

Towards designing such a manipulation, a Hamiltonian for the multi-mode parametric down-conversion process is calculated presently. Classically, it is understood that a time-varying electric field with Cartesian components, $E_k$, k=1,2,3, induces a slight redistribution of electrons when incident on a polarizable dielectric medium. If the medium has bilinear susceptibility $\chi_{ijk}$, the $i^{th}$ component of the polarization due to fields in the j, k directions is given by $P_i = \chi_{ijk} E_j E_k$. This, in turn, makes a contribution to the energy of the electromagnetic field that may be expressed as, by way of non-limiting example:

$$H_I = \frac{1}{2}\int_V P_i(\vec{r},t)E_i(\vec{r},t)d^3x + c.c.,$$

$$= \frac{1}{2}\int_V \chi_{ijk} E_i(\vec{r},t) E_j(\vec{r},t) E_k(\vec{r},t) d^3x + c.c. \quad (11)$$

In Equation (11), the volume of integration V is that of the nonlinear medium, the symbol $\vec{r}$ represents Cartesian coordinates, c.c. represents the complex conjugate of the term that precedes it, and the symbol t represents time. If $|\psi(0)\rangle$ is the state of the field at time t=0 in the interaction picture, then the state at a later time t>0 may, by way of non-limiting example, be given by the unitary (according to $\hat{U}(t)$) evolution:

$$|\Psi(t)\rangle = \hat{U}(t)|\Psi(0)\rangle = e^{-\frac{i}{\hbar}\int_0^t \hat{H}_I(t')dt'}|\Psi(0)\rangle. \quad (12)$$

In Equation (12), the symbol $\hat{H}_I$ represents a Hamiltonian for the multi-mode parametric down-conversion process. In the present instance, the initial state of the down-converted light is the vacuum state of the signal and idler beam, which may be denoted as, by way of non-limiting example:

$$|\psi(0)\rangle = |0\rangle_s |0\rangle_i. \quad (13)$$

In equation (13), the symbols $|0\rangle_s$ and $|0\rangle_i$ represent the ground states of the signal photons and idler photons, respectively. First order perturbation theory applied to Equation (12) yields an expression that may be represented as, by way of non-limiting example:

$$|\Psi(t)\rangle = |0\rangle_s |0\rangle_i - \frac{i}{\hbar}\int_0^t \hat{H}_I(t')dt'|0\rangle_s|0\rangle_i. \quad (14)$$

For times short compared to the average interval between down-conversions, and for a sufficiently weak pump interaction, this first order result provides a quantitative description of the down-conversion process in a non-linear $\psi^{(2)}$ crystal.

It is possible to induce coherence in down-conversion without inducing emission. This occurs for the two crystal configuration when a single pump beam impinges on the first crystal producing an entangled pair if the idler photon from this first down-conversion passes to the second crystal and is aligned with the idler from the second crystal's down-converted pair. The degree of coherence between the two down-converted signals can be controlled by varying the amplitude of the idler field reaching the second crystal. In one embodiment of the present invention, both the signal and idler photons produced by the first crystal are aligned with the signal and idler photons produced by the second crystal. Additionally, the degree of coherence may be manipulated by slight variations in the spatial separation, d, of the two crystals.

For a pair of thin crystals separated by a small distance d', the evolution operator decomposes into a sum of terms, governed by two interactions represented by Hamiltonians $\hat{H}_I^1$, $\hat{H}_I^2$. The first corresponds to entangled pair production on the first crystal, and the second corresponds to entangled pair production on the second crystal. These evolution operators may be written, by way of non-limiting example, in the form:

$$\hat{U}_I^1(t+\tau,t;\vec{r}_1=0) \equiv \frac{i}{\hbar}\int_0^t \hat{H}_I^1(t')dt' = \quad (15)$$
$$C\int d\vec{q}_s \int d\vec{q}_i v_V(\vec{q}_s+\vec{q}_i)a_{\vec{\varepsilon}_s}^+(\vec{q}_s)a_{\vec{\varepsilon}_i}^+(\vec{q}_i) + h.c..$$

$$\hat{U}_I^2(t'+\tau,t';\vec{r}_2) \equiv \frac{i}{\hbar}\int_0^{t'} \hat{H}_I^2(t'')dt'' = \quad (16)$$
$$C\int d\vec{q}_s \int d\vec{q}_i e^{-i\phi(\vec{q}_s,\vec{q}_i,d')}v_H(\vec{q}_s+\vec{q}_i)a_{\vec{\varepsilon}_s}^+(\vec{q}_s)a_{\vec{\varepsilon}_i}^+(\vec{q}_i) + h.c.$$

In Equations (15) and (16), $U_I^j$ is the evolution operator for the pump interaction with the j-th crystal, for j=1, 2. In these two expressions, $\tau$ represents the interaction time, assumed for purposes of computational convenience to be much longer than the coherence time of the down-converted light $$T_{dc}, \text{ and } t' = t + \frac{d}{c}.$$

The symbols $\vec{q}_s$ and $\vec{q}_i$ represent the transverse momenta of the signal photons and idler photons, respectively, and the term h.c. represents the hermitian conjugate of the term that precedes it. The phase in Equation (16) may be represented as, by way of non-limiting example:

$$\phi(\vec{q}_s,\vec{q}_p,d') \equiv [\sqrt{\vec{k}_s^2 - \vec{q}_s^2} + \sqrt{\vec{k}_i^2 - \vec{q}_i^2} - \sqrt{\vec{k}_p^2 - |\vec{q}_s + \vec{q}_i|^2}]d'. \quad (16a)$$

In Equation (16a), the terms $\vec{k}_s$ and $\vec{k}_i$ represent the 3-momentum of the signal photons and idler photons, respectively.

To arrive at these operators, it is reasonably assumed that the first crystal is centered at the origin of coordinates and the second crystal is centered at $\vec{r}_2 = \hat{z}d'$, i.e., a distance d' from the origin along the z-axis. The pump beam is reasonably assumed to be collimated, monochromatic, propagating along the z-axis, and described as a multimode coherent state $|v_{\hat{\epsilon}_p}(\vec{q}_p)\rangle$, where $v_{\hat{\epsilon}_p}(\vec{q}_p)$ is the pump angular spectrum with transverse momentum and $\vec{q}_p$ and $\vec{\epsilon}_p$ is the direction of the pump polarization. The aforementioned assumptions are physically reasonable and embraced for the purpose of computational convenience. Deviation from these assumptions is contemplated.

The two crystals are cut for Type I phase matching and have optical axes oriented 90° with respect to each-other. In Equation (15), the pump is polarized at 45° with respect the vertical plane (as defined by the pump direction and the optical axis of the first crystal) and hence is equally likely to down-convert in either crystal. In Type I down-conversion, signal and idler photons have the same polarization, orthogonal to that of the pump beam. So the vertical (respectively, horizontal) component of the pump, incident along the optical axis of the first (respectively, second) crystal, produces horizontally-polarized (respectively, vertically-polarized) signal and idler photons. The signal and idler photons from the first crystal, both horizontally polarized, are aligned with the optical axis of the second crystal, but at frequencies for which the second crystal is essentially transparent. Hence they are transmitted, with a phase delay due to the controlled separation between the two crystals, in a cone that overlaps that of the vertically-polarized, down-converted pairs produced by the second crystal.

IV. Coordinate and Coincidence Counting Details

Figure 4:
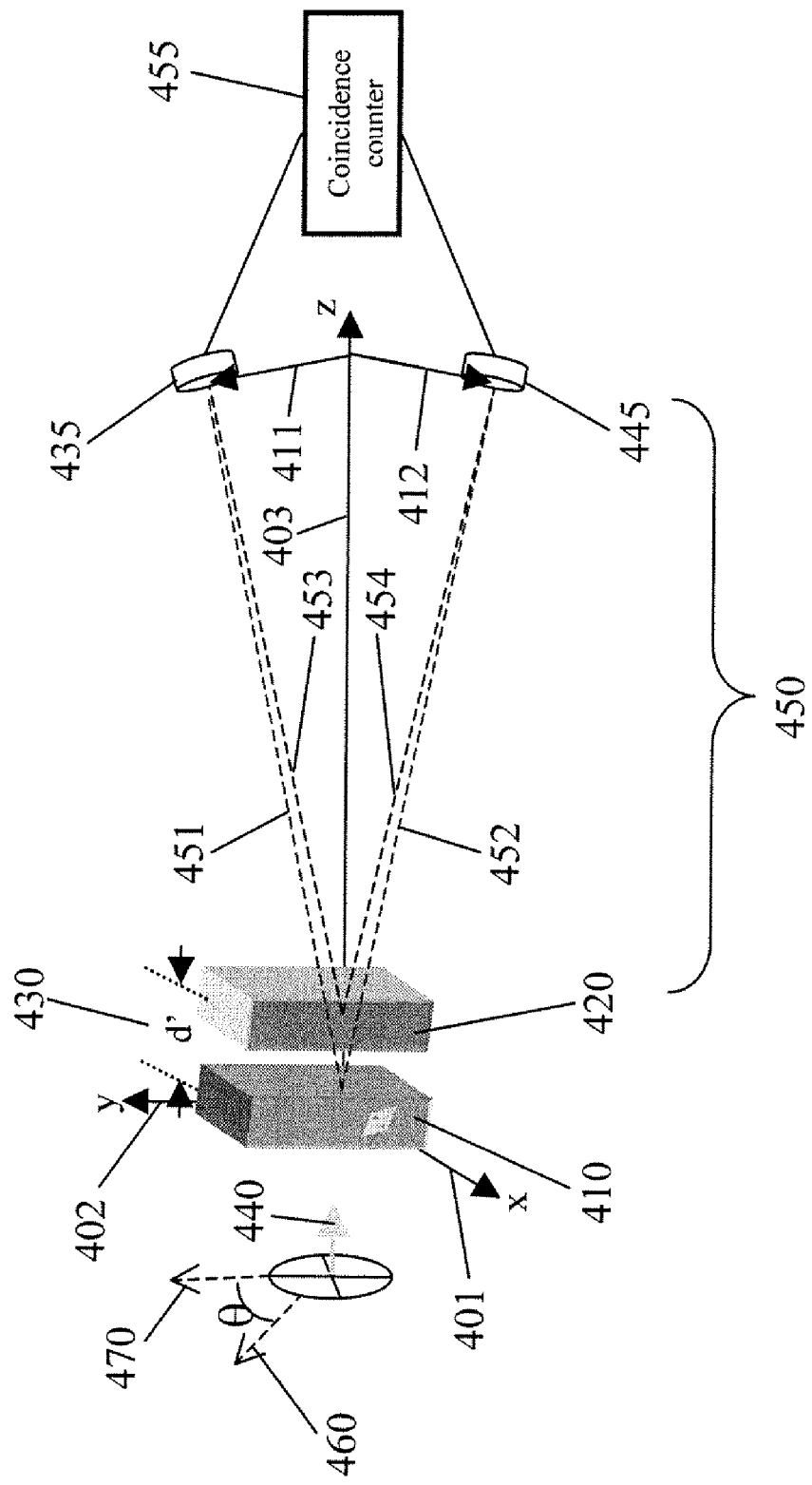
FIG. 4 is a schematic diagram illustrating certain coordinate conventions used herein for various calculations according to certain embodiments of the present invention.

FIG. 4 is a schematic diagram illustrating coordinate notation as used herein for certain calculations. In particular, FIG. 4 depicts x-, y-, and z-axes at 401, 402, and 403, respectively. First crystal 410 is separated from second crystal 420 by distance d' 430. Pump beam 340, polarized at angle θ 460 to the vertical 470, is directed to first crystal 410 and second crystal 420. Signal and idler beams 450 from first crystal 410 and second crystal 420 are indicated, as are the avalanche photo diodes ("APDs") 435, 445, which are used for detection. APD 435 is configured to detect signal photons, while APD 445 is configured to detect idler photons. Note that the signal photon and idler photon pairs detected by APDs 435, 445 may originate from either first crystal 410 or second crystal 420. APDs 435, 445 are coupled to coincidence counter 455. As discussed in detail below, analyzers may be placed in front of APDs 435, 445 to select polarization states $\{\theta_s, \theta_i\}$ for coincidence analysis.

Under the conventions of FIG. 4, the normal ordered fourth order correlation function derived from coincidence counting at APDs 435, 445 may be represented as, by way of non-limiting example:

$$C(\vec{r}_s, \vec{r}_i) \propto \langle \Psi | E_{\hat{\epsilon}_s}^{(-)}(\vec{r}_s) E_{\hat{\epsilon}_i}^{(-)}(\vec{r}_i) E_{\hat{\epsilon}_i}^{(+)}(\vec{r}_i) E_{\hat{\epsilon}_s}^{(+)}(\vec{r}_s) | \Psi \rangle. \quad (17)$$

In Equation (17), the term $|\Psi\rangle$ is obtained from Equations (14)-(16). The symbols $\vec{r}_s, \vec{r}_i$ represent detector locations for detection of the signal photons and idler photons, respectively. The positive frequency fields at the detectors that appear in Equation (17) may be represented as, by way of non-limiting example:

$$E_{\hat{\epsilon}_l}^{(+)}(\vec{r}_l) = \int d^2 q'_l a_{\epsilon_l}(\vec{q}'_l) e^{i\left(\vec{q}'_l \cdot \vec{p}_l + r_{jl}\sqrt{k_l^2 - q_l'^2}\right)}, \quad j = 1, 2; l \in \{s, i\}. \quad (18)$$

The negative frequency fields at the detectors which appear in Equation (17) may be represented as, by way of non-limiting example:

$$E_{\hat{\epsilon}_l}^{(-)}(\vec{r}_l) = \int d^2 q'_l a_{\epsilon_l}^+(\vec{q}'_l) e^{i\left(\vec{q}'_l \cdot \vec{p}_l + r_{jl}\sqrt{k_l^2 - q_l'^2}\right)}, \quad j = 1, 2; l \in \{s, i\}. \quad (19)$$

In Equations (18, 19), $\vec{r}_{jl}$ represents the distance from the center of the $j^{th}$ crystal to the center of the APD detector face. More particularly, $\vec{r}_{1s}$ represents the distance 451 signal photons originating in first crystal 410 travel to detector 435; $\vec{r}_{1i}$ represents the distance 452 idler photons originating in first crystal 410 travel to detector 435; $\vec{r}_{2s}$ represents the distance 453 signal photons originating in second crystal 420 travel to detector 445; and $\vec{r}_{2i}$ represents the distance 454 idler photons originating in second crystal 420 travel to detector 445. Note that the following definitions apply: $\vec{r}_{1s} \equiv \vec{\rho}_s + z_{1s}\hat{z}$, $\vec{r}_{1i} \equiv \vec{\rho}_i + z_{1i}\hat{z}$, $\vec{r}_{2s} \equiv \vec{\rho}_s + z_{2s}\hat{z}$, and $\vec{r}_{2i} \equiv \vec{\rho}_i + z_{2i}\hat{z}$, where $z_{1s}$, $z_{1i}$, $z_{2s}$, and $z_{2i}$ represent the z-axis components of $\vec{r}_{1s}$, $\vec{r}_{1i}$, $\vec{r}_{2s}$, and $\vec{r}_{2i}$ respectively, and $\vec{\rho}_s$ 411 and $\vec{\rho}_i$ 412 represent the transverse spatial positions of the detected signal and idler photons, respectively.

When pre-detection polarization analysis is performed by placing polarizers just prior to the signal and idler detectors 435, 445, the detected fields decompose into a form that may be represented as, by way of non-limiting example:

$$E_{\hat{\epsilon}_l}^{(\pm)}(\vec{r}_l) \rightarrow \text{Sin}(\theta_l) E_H^{(\pm)}(\vec{r}_l) + \text{Cos}(\theta_l) E_V^{(\pm)}(\vec{r}_l), l \in \{s, i\}. \quad (20)$$

Expressed in a different form, Equation (20) may be written as, by way of non-limiting example:

$$E_{\hat{\epsilon}_l}^{(+)}(\vec{r}_l) = \text{Sin}(\theta_l) \int d^2 q'_l a_H(\vec{q}'_l) e^{i\left(\vec{q}'_l \cdot \vec{p}_l + r_{1l}\sqrt{k_l^2 - q_l'^2}\right)} + \text{Cos}(\theta_l) \int d^2 q'_l a_V(\vec{q}'_l) e^{i\left(\vec{q}'_l \cdot \vec{p}_l + r_{2l}\sqrt{k_l^2 - q_l'^2}\right)}; \quad l \in \{s, i\}, \quad (21)$$

$$E_{\hat{\epsilon}_l}^{(-)}(\vec{r}_l) = \text{Sin}(\theta_l) \int d^2 q'_l a^+_H(\vec{q}'_l) e^{i\left(\vec{q}'_l \cdot \vec{p}_l + r_{1l}\sqrt{k_l^2 - q_l'^2}\right)} + \text{Cos}(\theta_l) \int d^2 q'_l a^+_V(\vec{q}'_l) e^{i\left(\vec{q}'_l \cdot \vec{p}_l + r_{2l}\sqrt{k_l^2 - q_l'^2}\right)}; \quad l \in \{s, i\}. \quad (22)$$

In Equations (21) and (22), the field operators obey the commutation relations $[a_\alpha(\vec{k}), a_\beta(\vec{q})] = [a^+_\alpha(\vec{k}), a^+_\beta(\vec{q})] = 0$ and $[a_\alpha(\vec{k}), a^+_\beta(\vec{q})] = \delta(\vec{k} - \vec{q}) \delta_{\alpha\beta}$ where α and β range over horizontal and vertical polarizations. In this last expression, the transmission axis of the polarizer in front of the signal (respectively, idler) detector makes an angle $\theta_s$ (respectively, $\theta_i$) with respect to the vertical polarization plane defined by the pump beam direction and the optical axis of first crystal 410. A slight simplification appears in Equations (21) and (22) because horizontally-polarized photons are produced in first crystal 410 and vertically-polarized photons are produced in second crystal 420. The 'crystal index' j can be set to 1 in the first term of each of these equations and set to 2 in the second term of each equation, as indicated. The fourth order correlation function of Equation (17) can be explicitly formed using Equations (21) and (22) and the two-photon state vector from Equation (14). Begin by simplifying the expression:

$$E_{\vec{\varepsilon}_i}^{(+)}(\vec{r}_i) E_{\vec{\varepsilon}_s}^{(+)}(\vec{r}_s)|\Psi\rangle. \tag{23}$$

Repeated use of the commutation relations above yields, by way of non-limiting example:

$$E_{\vec{\varepsilon}_i}^{(+)}(\vec{r}_i) E_{\vec{\varepsilon}_s}^{(+)}(\vec{r}_s)|\Psi\rangle = \mathrm{Sin}(\theta_i)\mathrm{Sin}(\theta_s) \tag{24}$$

$$\int d^2 q_i' \int d^2 q_s' e^{i\left(\vec{q}_i'\cdot\vec{\rho}_i + r_{1i}\sqrt{k_i^2 - \vec{q}_i'^2}\right)} e^{i\left(\vec{q}_s'\cdot\vec{\rho}_s + r_{1s}\sqrt{k_s^2 - \vec{q}_s'^2}\right)}$$

$$\int d^2 q_i \int d^2 q_s \delta(\vec{q}_i - \vec{q}_i')\delta(\vec{q}_s - \vec{q}_s') v_V(\vec{q}_i + \vec{q}_s)|0\rangle_s|0\rangle_i +$$

$$\mathrm{Cos}(\theta_i)\mathrm{Cos}(\theta_s) \int d^2 q_i' \int d^2 q_s' e^{i\left(\vec{q}_i'\cdot\vec{\rho}_i + r_{2i}\sqrt{k_i^2 - \vec{q}_i'^2}\right)}$$

$$e^{i\left(\vec{q}_s'\cdot\vec{\rho}_s + r_{2s}\sqrt{k_s^2 - \vec{q}_s'^2}\right)} \int d^2 q_i \int d^2 q_s \delta(\vec{q}_i - \vec{q}_i')$$

$$\delta(\vec{q}_s - \vec{q}_s') v_H(\vec{q}_i + \vec{q}_s) e^{-i\phi(\vec{q}_i,\vec{q}_s,d)}|0\rangle_s|0\rangle_i.$$

Integrating out the delta functions simplifies Equation (24) to, by way of non-limiting example:

$$= \mathrm{Sin}(\theta_i)\mathrm{Sin}(\theta_s) \int d^2 q_i \int d^2 q_s e^{i\left(\vec{q}_i\cdot\vec{\rho}_i + r_{1i}\sqrt{k_i^2 - \vec{q}_i^2}\right)} \tag{25}$$

$$e^{i\left(\vec{q}_s\cdot\vec{\rho}_s + r_{1s}\sqrt{k_s^2 - \vec{q}_s^2}\right)} v_V(\vec{q}_i + \vec{q}_s)|0\rangle_s|0\rangle_i +$$

$$\mathrm{Cos}(\theta_i)\mathrm{Cos}(\theta_s) \int d^2 q_i \int d^2 q_s e^{i\left(\vec{q}_i\cdot\vec{\rho}_i + r_{2i}\sqrt{k_i^2 - \vec{q}_i^2}\right)}$$

$$e^{i\left(\vec{q}_s\cdot\vec{\rho}_s + r_{2s}\sqrt{k_s^2 - \vec{q}_s^2}\right)} v_H(\vec{q}_i + \vec{q}_s) e^{-i\phi(\vec{q}_i,\vec{q}_s,d)}|0\rangle_s|0\rangle_i$$

This can be further simplified by implementing the following reasonable assumptions: (i) the magnitudes of the signal and idler transverse momenta are small compared to the longitudinal momenta (paraxial approximation), $|\vec{q}_s| \ll |\vec{k}_s|$, $|\vec{q}_i| \ll |\vec{k}_i|$; (ii) the signal and idler are degenerate in energy, $|\vec{k}_s| = |\vec{k}_i| \equiv k$ hence the pump momentum is $|\vec{k}_p| \equiv k_p = 2k$; and (iii) $r_{1i} = r_{1s} \equiv z$, $r_{2i} = r_{2s} \equiv z'$. With these simplifying assumptions, expanding the square roots and the phase term yields, by way of non-limiting example:

$$\sqrt{k^2 - \vec{q}_i^2} \approx k - \frac{\vec{q}_i^2}{2k}. \tag{26}$$

Equation (16a) yields, by way of non-limiting example:

$$\phi(\vec{q}_s, \vec{q}_i, d') \approx \left[k - \frac{\vec{q}_s^2}{2k} + k - \frac{\vec{q}_i^2}{2k} - k_p + \frac{|\vec{q}_s + \vec{q}_i|^2}{2k_p}\right]d' = \tag{27}$$

$$\frac{d'}{4k}\left(|\vec{q}_s + \vec{q}_i|^2 - 2(\vec{q}_s^2 + \vec{q}_i^2)\right).$$

An additional simplification can be achieved by transforming coordinates and momenta according to, by way of non-limiting example:

$$\vec{q}_\pm \equiv \frac{1}{2}(\vec{q}_i \pm \vec{q}_s), \vec{\rho}_\pm \equiv (\vec{\rho}_i \pm \vec{\rho}_s). \tag{28}$$

Equation (28) may be used to transform Equation (25) into, by way of non-limiting example:

$$= \mathrm{Sin}(\theta_i)\mathrm{Sin}(\theta_s) e^{2ikz} \int d^2 q_+ v_V(\vec{q}_+) \tag{29}$$

$$e^{i\left(\vec{q}_+\cdot\vec{\rho}_+ - \frac{\vec{q}_+^2 z}{k}\right)} \int d^2 q_- e^{i\left(\vec{q}_-\cdot\vec{\rho}_- - \frac{\vec{q}_-^2 z}{k}\right)}|0\rangle_s|0\rangle_i +$$

$$\mathrm{Cos}(\theta_i)\mathrm{Cos}(\theta_s) e^{2ikz'} e^{-i\left(\frac{k(\vec{\rho}_+ + \vec{d}')}{z'}\right)}$$

$$\int d^2 q_+ v_H(\vec{q}_+) e^{i\left(\vec{q}_+\cdot\vec{\rho}_+ - \frac{\vec{q}_+^2 z'}{k}\right)} \int d^2 q_- e^{i\left(\vec{q}_-\cdot\vec{\rho}_- - \frac{\vec{q}_-^2 z' - d'}{k}\right)}|0\rangle_s|0\rangle_i.$$

In Equation (29), $\vec{d}' \equiv \vec{z}d'$. The $d^2 q_-$ integrals can be performed using, by way of non-limiting example, $$\int d^2 q e^{i(\vec{q}\cdot\vec{\rho} - \vec{q}^2 a)} = e^{i\frac{\rho^2}{4a}}.$$

The remaining integrations may be defined as, by way of non-limiting example:

$$W_V(\vec{\rho}_+, z) \equiv \int d^2 q_+ v_V(\vec{q}_+) e^{i\left(\vec{q}_+\cdot\vec{\rho}_+ - \frac{\vec{q}_+^2 z}{k}\right)}, \tag{30}$$

$$W_H(\vec{\rho}_+, z') \equiv \int d^2 q_+ v_H(\vec{q}_+) e^{i\left(\vec{q}_+\cdot\vec{\rho}_+ - \frac{\vec{q}_+^2 z'}{k}\right)}.$$

Setting the detectors at z=z' for purposes of computational expediency, Equation (29) takes a form (up to an overall phase) that may be represented as, by way of non-limiting example:

$$E^{(+)}_{\varepsilon_i}(\vec{r}_i)E^{(+)}_{\varepsilon_s}(\vec{r}_s)|\Psi\rangle = \begin{pmatrix} \text{Sin}(\theta_i)\text{Sin}(\theta_s) \\ + \\ e^{i\vec{\rho}_-^2\frac{k}{4z}}W_V(\vec{\rho}_+,z) \\ \text{Cos}(\theta_i)\text{Cos}(\theta_s)e^{-i\left(\frac{k(\vec{\rho}_-\cdot\vec{d}')}{z}\right)} \\ e^{i\rho_-^2\frac{k}{4(z-d')}}W_H(\vec{\rho}_+,z) \end{pmatrix}|0\rangle_s|0\rangle_i . \quad (31)$$

An additional overall phase, $$e^{i\vec{\rho}_-^2\frac{k}{4z}},$$

can be removed, yielding, by way of non-limiting example:

$$E^{(+)}_{\varepsilon_i}(\vec{r}_i)E^{(+)}_{\varepsilon_s}(\vec{r}_s)|\Psi\rangle = \begin{pmatrix} \text{Sin}(\theta_i)\text{Sin}(\theta_s)W_V(\vec{\rho}_+,z) + \\ \text{Cos}(\theta_i)\text{Cos}(\theta_s)e^{-i\left(\frac{k(\vec{\rho}_-\cdot\vec{d}')}{z}\right)} \\ W_H(\vec{\rho}_+,z) \end{pmatrix}|0\rangle_s|0\rangle_i . \quad (32)$$

In Equation (32), terms of relative order $$\frac{|\vec{\rho}_-|}{z}$$

have been dropped in the exponential. Dropping such terms simplifies calculations without adversely affecting the analysis provided by the equations. The fourth order correlation, corresponding to coincidence detections between the signal and idler detectors, is obtained using this last expression and its hermitian conjugate in Equation (17). This correlation function may then be represented as, by way of non-limiting example:

$$C(\vec{\rho}_+,z,\varepsilon;\theta_i,\theta_s) = c\begin{pmatrix} \text{Sin}^2(\theta_i)\text{Sin}^2(\theta_s)|W_V(\vec{\rho}_+,z)|^2 + \\ \text{Cos}^2(\theta_i)\text{Cos}^2(\theta_s)|W_H(\vec{\rho}_+,z)|^2 + \\ \text{Sin}(\theta_i)\text{Sin}(\theta_s)\text{Cos}(\theta_i)\text{Cos}(\theta_s)\times \\ \begin{bmatrix} e^{i\varepsilon}W_V(\vec{\rho}_+,z)W_H^*(\vec{\rho}_+,z) + \\ e^{i\varepsilon}W_V^*(\vec{\rho}_+,z)W_H(\vec{\rho}_+,z) \end{bmatrix} \end{pmatrix} . \quad (33)$$

In Equation (33), $$\varepsilon \equiv \frac{-k(\vec{\rho}_+\cdot\vec{d}')}{z},$$

and c is an overall constant. In the following discussion, $(\vec{\rho}_+,z)$ will be assumed to be fixed.

A more suggestive, and in some respects more convenient, notation incorporating this last expression can be developed by defining the hermitian coherency matrix as, by way of non-limiting example:

$$\vec{J}(\vec{\rho}_+,z) = \begin{pmatrix} |W_H(\vec{\rho}_+,z)|^2 & e^{-i\varepsilon}W_H(\vec{\rho}_+,z)W_V^*(\vec{\rho}_+,z) \\ e^{i\varepsilon}W_V(\vec{\rho}_+,z)W_H^*(\vec{\rho}_+,z) & |W_V(\vec{\rho}_+,z)|^2 \end{pmatrix} \quad (34)$$

$$\equiv \begin{pmatrix} J_{HH}(\vec{\rho}_+,z) & J_{HV}(\vec{\rho}_+,z)e^{-i\varepsilon} \\ J_{VH}(\vec{\rho}_+,z)e^{i\varepsilon} & J_{VV}(\vec{\rho}_+,z) \end{pmatrix}.$$

Toward such a convenient notation, define the complex unit vector as, by way of non-limiting example:

$$\chi(\theta_i,\theta_s) \equiv \frac{1}{N(\theta_i,\theta_s)}\begin{pmatrix} \text{Cos}(\theta_i)\text{Cos}(\theta_s) \\ \text{Sin}(\theta_i)\text{Sin}(\theta_s) \end{pmatrix}, \quad (35)$$

$$N^2(\theta_i,\theta_s) = (\text{Cos}(\theta_i)\text{Cos}(\theta_s))^2 + (\text{Sin}(\theta_i)\text{Sin}(\theta_s))^2.$$

Using these two definitions and absorbing the overall constant c into C, a 'normalized' coincidence count rate can obtained from Equation (33) in the form of a trace that may be represented as, by way of non-limiting example:

$$\hat{C}(\vec{\rho}_+,z,\varepsilon;\theta_i,\theta_s) \equiv \frac{C(\vec{\rho}_+,z,\varepsilon;\theta_i,\theta_s)}{N^2(\theta_i,\theta_s)} \quad (36)$$

$$= Tr[\vec{J}(r\vec{\rho}_+),z,\varepsilon)\rho(\theta_i,\theta_s)].$$

In Equation (36), $\rho(\theta_i,\theta_s)$ is a density matrix, defined as, by way of non-limiting example:

$$\rho(\theta_i,\theta_s) \equiv \chi(\theta_i,\theta_s)\chi^+(\theta_i,\theta_s) \quad (37)$$

$$= \begin{pmatrix} \text{Cos}^2(\theta_i)\text{Cos}^2(\theta_s) & \text{Cos}(\theta_i)\text{Cos}(\theta_s)\text{Sin}(\theta_i)\text{Sin}(\theta_s) \\ \text{Cos}(\theta_i)\text{Cos}(\theta_s)\text{Sin}(\theta_i)\text{Sin}(\theta_s) & \text{Sin}^2(\theta_i)\text{Sin}^2(\theta_s) \end{pmatrix}$$

In equation (37), $\chi^+$ designates the hermitian conjugate of $\chi$. Using this notation, measurements are completely described by specifying the set $\{\in,\rho(\theta_i,\theta_s)\}$. This is shown to be the case by noting the following measurement set serves to determine the full coherency matrix $\vec{J}$:

$$\{\varepsilon,\rho(0,0)\},\{\varepsilon,\rho(\tfrac{\pi}{2},\tfrac{\pi}{2})\},\{0,\rho(\tfrac{\pi}{4},\tfrac{\pi}{4})\},\{\tfrac{\pi}{2},\rho(\tfrac{\pi}{4},\tfrac{\pi}{4})\}. \quad (38)$$

The required relationships, based entirely on measured coincidence data and hermiticity of the off-diagonal elements, may be expressed as, by way of non-limiting example:

$$\hat{C}(\vec{\rho}_+, z, \varepsilon; 0, 0) = Tr[\hat{J}(\vec{\rho}_+, z, \varepsilon)\rho(0, 0)] \quad (39)$$
$$= J_{HH}(\vec{\rho}_+, z),$$

$$\hat{C}(\vec{\rho}_+, z, \varepsilon; \frac{\pi}{2}, \frac{\pi}{2}) = Tr[\hat{J}(\vec{\rho}_+, z, \varepsilon)\rho(\frac{\pi}{2}, \frac{\pi}{2})] \quad (40)$$
$$= J_{VV}(\vec{\rho}_+, z),$$

$$\hat{C}(\vec{\rho}_+, z, 0; \frac{\pi}{4}, \frac{\pi}{4}) = Tr[\hat{J}(\vec{\rho}_+, z, 0)\rho(\frac{\pi}{4}, \frac{\pi}{4})] \quad (41)$$
$$= \frac{1}{4}(J_{HH}(\vec{\rho}_+, z) + J_{VV}(\vec{\rho}_+, z)) + \frac{1}{2}\text{Re}[J_{HV}(\vec{\rho}_+, z)],$$

$$\hat{C}(\vec{\rho}_+, z, \frac{\pi}{2}; \frac{\pi}{4}, \frac{\pi}{4}) = Tr[\hat{J}(\vec{\rho}_+, z, \frac{\pi}{2})\rho(\frac{\pi}{4}, \frac{\pi}{4})] \quad (42)$$
$$= \frac{1}{4}(J_{HH}(\vec{\rho}_+, z) + J_{VV}(\vec{\rho}_+, z)) + \frac{1}{2}\text{Im}[J_{HV}(\vec{\rho}_+, z)].$$

Equations (39) and (40) serve to define the diagonal elements of the coherency matrix. Given these two measurements, Equations (41) and (42) can be seen to yield (complex) off-diagonal terms that may be represented as, by way of non-limiting example:

$$J_{HV}(\vec{\rho}_+, z) \equiv \text{Re}[J_{HV}(\vec{\rho}_+, z)] + i\text{Im}[J_{HV}(\vec{\rho}_+, z)] \quad (43a)$$

$$2\text{Re}[J_{HV}(\vec{\rho}_+, z)] =$$
$$4\hat{C}(\vec{\rho}_+, z, 0; \frac{\pi}{4}, \frac{\pi}{4}) - \hat{C}(\vec{\rho}_+, z, \varepsilon; \frac{\pi}{2}, \frac{\pi}{2}) - \hat{C}(\vec{\rho}_+, z, \varepsilon; 0, 0).$$

$$2\text{Im}[J_{HV}(\vec{\rho}_+, z)] = \quad (43b)$$
$$4\hat{C}(\vec{\rho}_+, z, \frac{\pi}{2}; \frac{\pi}{4}, \frac{\pi}{4}) - \hat{C}(\vec{\rho}_+, z, \varepsilon; \frac{\pi}{2}, \frac{\pi}{2}) - \hat{C}(\vec{\rho}_+, z, \varepsilon; 0, 0).$$

From these last expressions, the remaining off-diagonal terms may be represented as, by way of on-limiting example:

$$J_{HV}(\vec{\rho}_+, z) = J_{VH}^*(\vec{\rho}_+, z). \quad (44)$$

To summarize to this point, an input pump beam consisting of two images, one horizontally polarized and one vertically polarized, are polarization entangled by passage through two separated, non-linear crystals 410, 420 cut for type-I down-conversion with optical axes at right angles to each-other. The pump 440 incidence direction and the optical axis of the first crystal 410 determine a 'plane of polarization' for the entire system. Through the phase matching requirements of the down-conversion process, polarization entanglement is converted to transverse momentum entanglement for the two images and for any subset of spatial positions (e.g., pixels) within each of the entangled images. The resulting quantum state consists of a superposition of two (propagated) complex images whose transverse momenta are entangled.

Users then perform two-photon coincidence counting. This results in measurements with a spatial profile consisting of a mix of polarization states. The mixture content is determined by pre-detection polarization analysis performed at coincidence detectors 435, 445, 455. The object describing the degree of coherence of the entangled images, the complex coherency matrix, has been related to coincidence measurement data. A set of four measurements determines the full complex coherency matrix at the spatial location defined by coincidence detector placement. By using a paired, calibrated array of coincidence detectors (by way of non-limiting example), the complex coherency matrix may be determined as a function of $(\vec{\rho}_+, z)$.

Determination of the amplitude and phase of an unknown signal, say $W_H(\vec{\rho}_+, z)$, can be achieved by encoding the unknown $v_H(\vec{\rho}_+)$ transverse momentum mask on the horizontally polarized input and encoding the following expression on the vertically polarized input:

$$v_V(\vec{q}_+) = \frac{A}{2\pi} e^{-i\vec{q}_+^2 \frac{z}{k}} \delta(\vec{q}_+). \quad (45)$$

In Equation (45), A is a constant. Combining the form of $v_V(\vec{\rho}_+)$ from Equation (45) with Equation (30) yields $W_V(\vec{\rho}_+, z)=A$. The elements of the coherency matrix for these inputs may be represented as, by way of non-limiting example:

$$J_{HH}(\vec{\rho}_+, z) = |W_H(\vec{\rho}_+, z)|^2, J_{VV}(\vec{\rho}_+, z) = A^2, J_{HV}(\vec{\rho}_+, z) = A(\text{Re}[W_H(\vec{\rho}_+, z)] + i\text{Im}[W_H(\vec{\rho}_+, z)]), J_{VH}(\vec{\rho}_+, z) = J_{HV}^*(\vec{\rho}_+, z). \quad (46)$$

Equation (46) yields, for the unknown complex signal and by way of non-limiting example:

$$W_H(\vec{\rho}_+, z) = \frac{1}{\sqrt{J_{VV}}} J_{HV}(\vec{\rho}_+, z). \quad (47)$$

In terms of the measurements from Equations (39)-(42) and Equations (43)-(44), this last expression for the unknown signal may be expressed as, by way of non-limiting example:

$$W_H(\vec{\rho}_+, z) = \frac{1}{\sqrt{\hat{C}(\vec{\rho}_+, z, \varepsilon; \frac{\pi}{2}, \frac{\pi}{2})}} \left( \begin{array}{c} 2\left(\begin{array}{c} \hat{C}(\vec{\rho}_+, z, 0; \frac{\pi}{4}, \frac{\pi}{4}) + \\ i\hat{C}(\vec{\rho}_+, z, \frac{\pi}{2}; \frac{\pi}{4}, \frac{\pi}{4}) \end{array}\right) - \\ \frac{1+i}{2}\left(\begin{array}{c} \hat{C}(\vec{\rho}_+, z, \varepsilon; \frac{\pi}{2}, \frac{\pi}{2}) + \\ \hat{C}(\vec{\rho}_+, z, \varepsilon; 0, 0) \end{array}\right) \end{array} \right). \quad (48)$$

According to certain embodiments of the present invention, various degrees of freedom may be exploited. By way of non-limiting example, the following parameters may be manipulated: polarization states (e.g., $\theta_s$, $\theta_i$), transverse spatial positions (e.g., $\vec{\rho}_s$, $\vec{\rho}_i$, $\vec{\rho}_+$, $\vec{\rho}_-$), longitudinal spatial position (e.g., z), crystal separation (e.g., d), and delay. Any of these parameters may be adjusted during operation of an embodiment of the present invention and/or used as independent variables, e.g., to facilitate solving systems of equations.

V. Additional Features and Modifications

Certain embodiments of the present invention may be viewed as general purpose quantum optical computers. In such embodiments, a first polarized light component is encoded with first information, the properties of which may be regarded as completely or partially unknown. A second polarized light component is encoded with information that may be analogized to a computer program, which is used to process or gather information regarding the first information. (In the embodiment of FIG. 3, the first information corresponds to signal $v_y$, which is encoded into vertically polarized component 380. The second information corresponds to signal $\Xi_x$, which is encoded into horizontally polarized component 385.) Thus, such embodiments are "programmed" by encoding second information (e.g., $v_x$ of FIG. 3) onto a polarized light component (e.g., 385 of FIG. 3). This "programming" allows the general-purpose quantum optical computer to process or determine properties of the first information encoded in the first polarized light component. Such embodiments conduct and analyze coincidence count measurements for different values of any, or a combination, of parameters such as polarization, transverse or longitudinal spatial positions, crystal separation, and delay. Analyzing the measured coincidence counts in accordance with the equations and supporting discussions presented herein reveals information regarding the first signal as selected by choice of "program" encoded in the second signal.

According to certain embodiments of the present invention, sensors may be configured to derive information regarding a collection of entangled image portions (e.g., pixels or qbits) within the image data. Such embodiments may employ two detectors: a first detector used to detect photons in multiple locations, and a second detector used to detect photons in a single location corresponding to a pixel. Because the first detector may be configured to globally detect photons, it need not be moved during operation of the embodiment. The second detector, on the other hand, may be configured to detect individual photons that are entangled with photons detected by the first detector. By moving the second detector to multiple locations and performing signal processing at each location, an embodiment of the present invention may be used to derive information about each of a plurality of pixels. Alternately, two stationary detectors capable of detecting photons in multiple locations may be used. That is, a bank of stationary detectors may be used instead of a movable detector. Such a bank may be paired with a detector capable of detecting photons at multiple locations.

Each constituent photon of an entangled photon pair has a small neighborhood about it (a "correlation neighborhood") in which spatial locations are highly correlated. Spatial locations or positions separated by distances greater than the associated correlation length are spatially independent and may be considered to be independent pixels. Thus, each correlation neighborhood about a particular spatial location may be considered as a separate pixel.

Entangled pixel pairs may be considered as qbits. Elemental spatial positions (e.g., pixels) are in an entangled state. That is, each pixel from a first image (e.g., $V_x$) is entangled with a corresponding pixel from a second image (e.g., $V_y$), thus forming a single-qbit state. Any plane passing through entangled image-encoded beams according to certain embodiments of the present invention will contain such qbits. Accordingly, embodiments of the present invention may be used to construct a two-dimensional presentation of qbits. In general, spatially-distinct subsets of such a presentation may be considered and processed independently (e.g., with multiple detectors).

A two-dimensional presentation of qbits may also contain entangled multi-qbit states, because any given collection of qbits in the presentation may be entangled together. In certain embodiments of the present invention, each pixel in a given subset of pixels from a first image is entangled with a corresponding pixel from a second image. Such a collection of entangled pixel pairs forms a multi-qbit state. A collection of qbits considered as an entangled multi-qbit state may or may not form a spatially continuous region. For example, a two-qbit entangled state may exist as two spatially separate regions in a presentation.

According to certain embodiments of the present invention, non-local operations and superposition may be used to manipulate quantum states. Unlike classical signal processing, which exploits local correlations and measurements, processing in a quantum environment is not restricted to local operations. One type of non-local processing is teleportation. (A measurement is "non-local" if it cannot be reduced to a finite sequence of local measurements.) While teleportation is generally not considered a computational resource in any known algorithm, it does illustrate the fundamental utility of entanglement and non-local processing (measurement). Another feature that may be exploited in developing quantum algorithms for processing classical signals encoded in the quantum states described herein is superposition.

Entangled photons may be produced from photons of any frequency consistent with the present invention.

Conventional computer equipment and applications may be used to accomplish the various calculations, comparisons, and judgments required during operation according to embodiments of the present invention. Such calculations, comparisons, and judgments are preferably performed automatically during the normal course of operation of embodiments of the present invention. Exemplary calculations, comparisons, and judgments that may be so performed include those elucidated by the enumerated Equations disclosed herein.

Note that the terms "signal" and "idler" may be used interchangeably. More particularly, as used herein, no distinction is drawn between signal photons and idler photons. The term "modulate" may be used to describe encoding information as discussed herein.

Other types of entangled photons and techniques for producing them within the scope of the present invention include the following. Those of ordinary skill in the art are capable of producing entangled-photon pairs, triples, etc. By way of non-limiting example, entangled photons may be produced according to types I or II parametric down-conversion. That is, biphotons whose constituent signal and idler photons are orthogonally polarized may be used as well as biphotons whose constituent signal and idler photons are polarized in parallel. For type-I down-conversion, signal photons may be separated from idler photons (and recombined with idler photons) using dichroic glass. For both types of down-conversion, signal photons and idler photos may be selected as they exit the biphoton source by providing apertures at the appropriate angles. Any non-central symmetric nonlinear crystal, not limited to BBO, may be used. Other ways to produce entangled photons include: excited gasses, materials without inversion symmetry, and generally any properly phase-matched medium. Furthermore, the entangled photons are not limited to any particular wavelength or frequency.

In embodiments of the present invention, coincidence counting may be accomplished according to a variety of forms. By way of non-limiting example, avalanche photodiodes, photo multiplier tubes, or other devices may be used to detect photons consistent with the present invention. That is, the invention is not limited to the use of avalanche photodiodes.

The equations used to describe the exemplary embodiments of the invention described herein are illustrative and representative and are not meant to be limiting. Alternate equations may be used to represent the same phenomena described by any given equation disclosed herein. In particular, the equations disclosed herein may be modified by adding or removing error-correction terms, higher-order terms, or otherwise accounting for inaccuracies, using different names for constants or variables, using different expressions, or accounting for propagation of light through different media. Other modifications, substitutions, replacements, or alterations of the equations may be performed in keeping with the present invention.

In certain portions of this disclosure, certain assumptions are made for the purpose of computational convenience. Such assumptions are generally justified because the situations that they describe are physically practicable. Such assumptions also generally yield equations that provide robust approximations to the behavior of the actual physical systems under consideration. Moreover, the equations and analysis associated with such assumptions may be modified by those of skill in the art to accommodate reasonable deviations from the assumptions, as contemplated by the inventor. That is, embodiments of the present invention may depart from these assumptions. Those of ordinary skill in the art may adjust the analysis presented herein, if necessary, for embodiments that depart from such assumptions.

The particular optical manipulation devices depicted herein are illustrative and representative and are not meant to be limiting. By way of non-limiting example, apertures, filters, lenses, and particular lasers disclosed herein may be replaced with devices known to those of ordinary skill in the art.

Note that this disclosure follows standard physics notation and notational conventions. By way of non-limiting example, in some places Planck's constant h (and h) and the speed of light c may both considered to be one (1) for the purpose of calculations. This convention allows, inter alia, for common units for frequency and energy, as well as common units for time and distance (e.g., temporal delays may be considered as spatial lengths and vice versa). This notational convention is accounted for after calculations have been performed in order to deduce correct units for application purposes. This disclosure also uses standard physical notations known to those of ordinary skill in the art, such as Dirac bracket notation (e.g., $|\psi_i\rangle$ to denote quantum states, i to denote the square root of negative one, and e to denote the natural logarithm base.

The terminology used herein is for the purpose of describing particular embodiments only and is not intended to limit the scope of the present invention. As used throughout this disclosure, the singular forms "a," "an," and "the" include plural reference unless the context clearly dictates otherwise.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses.

What is claimed is:

1. An apparatus for processing complex signals, the apparatus comprising:
    a source of light;
    a polarizer in optical communication with the source of light, the polarizer configured to produce polarized light;
    a polarizing beam splitter in optical communication with the polarizer, the polarizing beam splitter configured to produce light having a first polarization and light having a second polarization, the first polarization being different from the second polarization;
    a first aperture configured to receive the light having the first polarization and produce first encoded light, the first encoded light being encoded with first information;
    a second aperture configured to receive the light having the second polarization and produce second encoded light, the second encoded light being encoded with second information;
    at least two adjacent nonlinear crystals configured to receive the first encoded light and the second encoded light, the two adjacent nonlinear crystals being separated by a distance; and
    a coincidence counter configured to detect coincidences between entangled photons, the entangled photons exiting the at least two adjacent nonlinear crystals.

2. The apparatus of claim 1 where the at least two nonlinear crystals comprise a first crystal having a first optical axis and a second crystal having a second optical axis, wherein the first optical axis is perpendicular to the second optical axis.

3. The apparatus of claim 1 further comprising an optical delay interposed between the first aperture and the at least two adjacent nonlinear crystals.

4. The apparatus of claim 1 wherein the polarizing beam splitter has a first polarization direction, wherein the polarized light has a second polarization direction, and wherein the first polarization direction is at an angle of 45° with respect to the second polarization direction.

5. The apparatus of claim 1 further comprising means for detecting photons at a plurality of locations, the means for detecting photons in operative communication with the coincidence counter.

6. The apparatus of claim 1 further comprising logic configured to calculate a parameter associated with the first information and the second information.

7. The apparatus of claim 6 wherein the parameter comprises at least pan of a complex coherency matrix.

8. The apparatus of claim 6 wherein the first information is substantially unknown and the parameter comprises information selected from the group consisting of: an amplitude of an unknown signal associated with the first information, and a phase of an unknown signal associated with the first information.

9. The apparatus of claim 6, wherein the first information at least partially determines the parameter.

10. A method for processing complex signals, the method comprising:
    generating polarized light;
    splitting the polarized light into a first polarized component spatially separated from a second polarized component, the first polarized component and the second polarized component collectively comprising first entangled photons;
    modulating the first polarized component with a first signal;
    modulating the second polarized component with a second signal;
    directing the first polarized component and the second polarized component through at least two adjacent nonlinear crystals to produce light comprising second entangled photons;

performing a plurality of coincidence measurements on the light comprising second entangled photons; and determining, based on the plurality of coincidence measurements, at least one parameter associated with the first signal.

11. The method of claim 10, wherein the at least two adjacent nonlinear crystals are configured to have substantially perpendicular optical axes.

12. The method of claim 10 further comprising delaying the first polarized component.

13. The method of claim 10 wherein the step of splitting comprises passing the polarized light through a polarizing beam splitter, wherein a polarization direction of the polarized light is at an angle of 45° to a polarization direction of the polarizing beam splitter.

14. The method of claim 10 wherein the step of performing a plurality of coincidence measurements comprises performing a plurality of coincidence measurements at different locations.

15. The method of claim 10 wherein the step of performing a plurality of coincidence measurements comprises performing a plurality of coincidence measurements for different distances between the at least two adjacent nonlinear crystals.

16. The method of claim 10 further comprising transferring an angular spectrum associated with the first signal and the second signal to an entangled photon state.

17. The method of claim 10 wherein the parameter is selected from the group consisting of: an amplitude of the first signal, a phase of the first signal, an amplitude of the second signal, a phase of the second signal, and a complex coherency matrix associated with the first signal and the second signal.

18. The method of claim 10 wherein the steps of performing and determining comprise determining a fourth-order correlation function.

19. The method of claim 10 wherein the step of splitting comprises producing maximally entangled photons.

20. The method of claim 10 wherein the step of performing a plurality of coincidence measurements comprises performing a plurality of coincidence measurements between entangled photon pairs produced by a component selected from the group consisting of: the first nonlinear crystal and the second nonlinear crystal.

21. The method of claim 10 wherein the steps of splitting and directing comprise producing multiply entangled photons.

22. The method of claim 10 wherein the first signal comprises synthetic aperture radar information.

23. The method of claim 10 wherein the step of performing a plurality of coincidence measurements comprises performing a plurality of coincidence measurements for different values of a parameter selected from the group consisting of: a polarization state, a transverse spatial position, a longitudinal spatial position, a delay, an a quantum state produced by a non-local operation.

24. The method of claim 10 further comprising selecting the second signal, whereby the parameter associated with the first signal is at least partially determined by the second signal.

25. A method for processing complex signals comprising:
providing light;
imposing a first signal on a first polarized component of the light to produce first encoded light;
imposing a second signal on a second polarized component of the light to produce second encoded light;
transmitting the first encoded light and the second encoded light through adjacent nonlinear crystals separated by a distance; and
determining a property of one of the first signal and the second signal using results of at least four coincidence measurements of entangled photons.

26. A method of encoding classical information as a quantum state, the method comprising:
producing light;
separating the light into a first polarized component and a second polarized component;
modulating the first polarized component with a first classical signal to produce first modulated light;
modulating the second polarized component with a second classical signal to produce second modulated light; and
directing the first modulated light and the second modulated light through a first downconverter and a second downconverter.

* * * * *